3,079,225
PROCESS FOR SEPARATING AMERICIUM AND CURIUM FROM RARE EARTH ELEMENTS

Russell D. Baybarz, Powell, and Milton H. Lloyd, Oak Ridge, Tenn., assignors to the United States of America as represented by the United States Atomic Energy Commission
No Drawing. Filed May 15, 1961, Ser. No. 110,274
8 Claims. (Cl. 23—14.5)

Our invention relates to methods for processing neutron-irradiated fissile materials and more particularly to methods for separating americium and curium from rare earth elements.

The actinide elements americium and curium, because of their high activity and reasonably long half-life, have become useful as radiation sources. Radiation-source applications require high purity elements uncontaminated by other radioactive elements; however, americium and curium, upon formation, are associated with fission products including rare earth fission products. Separation of americium and curium from rare earth elements presents difficulties because of the similar chemical properties of these actinides and the rare earths. Americium and curium in an aqueous solution are in the trivalent oxidation state and cannot be oxidized easily; consequently, separation methods based on changes in valence are impracticable. Ion exchange methods have been employed in the prior art to separate rare earths from americium and curium; however, ion exchange methods have the disadvantage that one ion exchange cycle may not achieve the desired degree of separation, and, although two ion exchange cycles provide a high degree of separation, difficulties are ordinarily encountered in adjusting the concentration of ions in the eluate from the first ion exchange cycle prior to sorption in the second cycle.

Liquid-liquid extraction methods using monoalkylphosphoric acids to extract rare earths from a hydrochloric acid solution have been employed to separate americium from the rare earths and to separate curium from the heavier rare earths; however, a high degree of separation of curium from lanthanum is not practicable because the distribution coefficients of these two elements are so nearly alike.

One object of our invention, therefore, is to provide an improved method of separating americium and curium from rare earth elements.

Another object of our invention is to provide a method of separating americium and curium from rare earth elements using a minimum of process steps.

We have discovered a combination of ion exchange and liquid-liquid extraction steps which is simple and yet provides a high degree of separation of americium and curium from rare earths.

In accordance with our invention, therefore, we have provided a process for recovering actinide values selected from the group consisting of americium and curium values from an acidic aqueous solution containing said values together with rare earth values comprising the steps of providing a high concentration of lithium nitrate in said solution; contacting the resulting aqueous solution with an anion exchange resin whereby said actinide and rare earth values are sorbed on said resin; contacting the resulting loaded resin with an aqueous solution containing a high concentration of lithium chloride whereby a major portion of said sorbed rare earth values are eluted from said resin; contacting the resulting partially-loaded resin with a dilute aqueous solution of lithium chloride whereby actinide and a minor proportion of rare earth values are eluted from said partially-loaded resin and transferred into said dilute lithium chloride solution; separating the resulting actinide and rare earth value-containing aqueous solution from the stripped resin; providing a high concentration of lithium chloride in said separated solution; contacting the resulting lithium chloride-loaded aqueous solution with substantially water-immiscible organic solution comprising an organic diluent and a monoalkylphosphoric acid whereby rare earth values are transferred from the aqueous solution into said organic solution; separating the remaining aqueous solution from the resulting organic solution, and recovering actinide values from said separated aqueous solution.

Our process achieves a higher degree of separation of americium and curium from rare earth values than is practicable in the liquid-liquid extraction system or in a single column ion exchange system. Our process is readily incorporated into prior art methods of processing irradiated plutonium, and is especially useful as an adjunct to processes producing a nitrate solution of americium, curium and rare earth values.

In carrying out our invention an acidic aqueous feed solution containing americium and curium values together with rare earth values and provided with a high concentration of lithium nitrate is contacted with an anion exchange resin. Methods of forming this aqueous feed solution are well-known and do not constitute a part of our invention, the following details being given merely to provide a better understanding of our invention and the way in which it may be carried out.

In one method for producing americium and curium, a $Pu^{239}$ aluminum alloy is neutron-irradiated whereby $Pu^{242}$, $Am^{243}$ and $Cm^{244}$ are formed. The resulting irradiated mass is dissolved in nitric acid and the resulting acidic nitrate solution is brought into contact with an organic phase comprising tributylphosphate. The plutonium values transfer into the organic phase. The remaining raffinate is neutralized and americium, curium and rare earth values contained therein are extracted into a tributylphosphate organic phase. This organic phase is then contacted with an acidic aqueous nitrate solution, thereby stripping americium, curium and rare earth values from the organic phase. The resulting aqueous solution containing americium, curium and rare earths is one source of a feed solution for our process.

The concentration of lithium nitrate in the feed solution brought into contact with the anion exchange resin may suitably be in the range of 6 to 9 molar, approximately 8 molar being preferred. Lithium nitrate may be added as a salt or as a concentrated aqueous solution of lithium nitrate.

The pH of the feed solution is critical, since sorption of rare earths and actinides decreases rapidly as the free acid concentration increases, and iron which may be present will precipitate if the pH exceeds approximately 2.0. The pH must be in the range of from 0 to 4, and the preferred range is from 0.5 to 1.5.

The type of anion exchange resin used is not critical. Resins having quaternary ammonium as an active group as represented by the trade-marked resins Dowex 1-8X, Dowex 21K and Permutit SK have been found to be suitable.

The rate of flow of the feed solution through the resin bed may be varied up to at least 6 milliliters per square centimeter per minute with little effect on sorption of rare earths, americium and curium.

We have found that the resin can be loaded to at least approximately 12 grams of rare earths, americium and curium per liter of resin.

Although a wash step may be omitted, in the preferred method of carrying out our invention the resin, loaded with rare earths, americium, and curium and containing iron, nickel, and chromium, is washed with a concentrated aqueous solution of lithium nitrate, thereby eluting the weakly sorbed iron, nickel and chromium from the resin bed. The concentration of lithium nitrate in the wash solution may suitably range from 7 to 9 molar, approximately 8 molar being preferred.

The pH of the wash solution must be in the range of 0 to 5, a pH of approximately 3 being preferred.

The volume of wash solution passed through the bed may be varied from 0 to 10 times the volume of voids in the resin bed. (The volume of voids in the resin bed is approximately equal to one-half the bulk resin volume.)

The washed resin bed, containing rare earths, americium and curium, is next contacted with a concentrated solution of lithium chloride, which preferentially elutes rare earths from the bed. The concentration of lithium chloride may vary from 9 to 12 molar, while a concentration of approximately 10 molar is preferred.

The acidity of the concentrated solution of lithium chloride must be from 0 to 1 molar, and it is preferred that the solution have a pH of approximately 3.

We have found that the flow rate of the concentrated solution of lithium chloride must be kept low in order to keep the volume of eluate to a minimum and to prevent americium and curium from eluting with the rare earths. Flow rates less than 2 milliliters per square centimeter per minute are preferred. At these flow rates a volume of concentrated lithium chloride equivalent to approximately 10 times the volume of voids in the resin bed is sufficient to elute the rare earths without eluting more than a small portion (less than one percent) of the sorbed americium and curium.

The resin bed, stripped of the major portion of rare earths, is next contacted with a dilute solution of lithium chloride, thereby removing americium and curium together with the remaining rare earths from the resin bed. The concentration of lithium chloride in this eluting solution must be in the range of 0.1 to 5 molar and the preferred concentration is from 1 to 2 molar.

The flow rate of this eluting solution is not critical, but the concentration of americium and curium in the eluate is higher with low flow rates; accordingly, it is desirable to keep the eluate flow rate low, preferably no greater than approximately 2 milliliters per square centimeter per minute. A volume of dilute lithium chloride solution equivalent to two times the volume of voids in the resin bed will remove substantially all the americium and curium values from the bed at these low flow rates.

The temperature at which the sorption, wash, and elution steps are carried out may range from 60 to 90° C. As the temperature decreases below 60° C. the percent of actinides recovered with reasonable volume of elutriant decreases drastically; no benefit is achieved by operating at temperatures above 90° C. A temperature within the range of 80 to 85° C. is preferred.

The eluate containing americium, curium, and a minor portion or rare earths is then acidified with HCl and provided with a high concentration of lithium chloride. The resulting solution is contacted with an organic phase comprising a water-immiscible organic diluent and a monoalkylphosphoric acid. The rare earths preferentially extract into the organic phase leaving highly purified americium and curium in the aqueous phase.

The concentration of lithium chloride in the aqueous phase must be in the range of 8 to 12 molar, a concentration in the range of 9 to 10 molar being preferred.

The HCl concentration in the aqueous phase must be in the range of 0.01 M to 1.0 M, and best separation of americium and curium from rare earths is obtained if the HCl concentration is from 0.4 to 0.6 molar.

The rare earth concentration in the aqueous phase must be less than approximately 1 gram per liter in order to keep the distribution coefficient (concentration of rare earths in organic/concentration of rare earths in aqueous phase) for the rare earths reasonably high. Typically the concentration of rare earths in the eluate containing americium and curium is in the range of 0.1 to 1 gram per liter.

Any monoalkylphosphoric acid represented by the formula

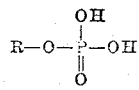

where R contains 6 to 10 carbon atoms, will selectively extract rare earths, leaving americium and curium in the aqueous phase. The preferred monoalkylphosphoric acid is mono-2-ethylhexylphosphoric acid.

Any one of a wide variety of organic liquids may be used as the diluent, particularly good results being achieved with straight chain hydrocarbons as exemplified by kerosene and n-heptane and aromatic hydrocarbons as exemplified by toluene and xylene.

In the preferred form of carrying out our invention the organic phase containing rare earths is contacted with an acidic aqueous lithium chloride scrub solution. The concentration of lithium chloride may vary from 8 to 12 molar, a molarity of 10 being preferred. The scrub solution must contain HCl in a concentration of 0.01 to 1 molar, a molarity of 1 being preferred.

In carrying out the extraction, phase ratios of organic: aqueous:scrub may vary from 1:1:1 to 6:1:3.

It is obvious that any conventional liquid-liquid contacting equipment such as mixer-settlers, packed columns and pulse columns may be used to carry out the extraction portion of our process.

The following example is given to illustrate our invention in more detail.

*Example*

500 milliliters of an 8 molar lithium nitrate solution having a pH of 1.0 and containing 2.5 grams of rare earths, 0.001 gram of americium and curium, and 2 grams of iron, chromium, and nickel is introduced into the top of a 1 inch diameter column 60 centimeters long and filled with 100–200 mesh Dowex 1–10X anion exchange resin. The solution is passed through the column at a rate of 6 milliliters per square centimeter per minute. The effluent contains 1.5 grams of iron, nickel and chromium, but no rare earths, americium or curium.

900 milliliters of a wash solution 8 molar in lithium nitrate having a pH of 3 is passed through the column at a rate of 6 milliliters per square centimeter per minute. The effluent contains 0.5 gram of nickel, iron and chromium.

1500 milliliters of a 10 molar lithium chloride solution having a pH of 3 is passed through the column at a rate of 2 milliliters per square centimeter per minute. The effluent contains 2.4 grams of the rare earths and no detectable americium and curium.

300 milliliters of a 1 molar lithium chloride solution having a pH of 3 is passed through the column at a rate of 2 milliliters per square centimeter per minute. The effluent contains .001 gram of americium and curium and 0.1 gram of rare earths.

The americium and curium-containing effluent is made 10 molar in lithium chloride and 0.5 molar in HCl and is passed into an extraction where it is contacted with 900 milliliters of 0.5 molar mono-2-ethylhexylphosphoric acid in xylene. The resulting organic phase is scrubbed with 300 milliliters of an aqueous solution 10 molar in lithium chloride and 1.0 molar in HCl. The aqueous solutions contain 0.001 gram of americium and curium and no detectable rare earths.

The foregoing example is intended to illustrate and not restrict our invention. It will be recognized by those skilled in the art that variations may be made in process conditions such as flow rates and reagent concentrations. For instance, the concentration of monoalkylphosphoric acid in the diluent may be varied over a wide range, and the specific concentration selected will depend on a variety of factors such as phase ratios, flow rates, viscosities, desired loading of the rare earths in the organic phase, and the concentration of rare earths in the aqueous phase. Accordingly, our invention should be limited only as is indicated in the appended claims.

Having thus described our invention, we claim:

1. A process for recovering actinide values selected from the group consisting of americium and curium values from an acidic aqueous solution containing said values together with rare earth values comprising the steps of providing lithium nitrate in a concentration of at least 6 moles in said solution; contacting the resulting aqueous solution with an anion exchange resin whereby said actinide and rare earth values are sorbed on said resin; contacting the resulting loaded resin with an aqueous solution containing lithium chloride in a concentration of at least 9 molar whereby a major portion of said sorbed rare earth values are eluted from said resin; contacting the resulting partially-loaded resin with a dilute aqueous solution of lithium chloride, the concentration of lithium chloride in said dilute solution being less than 5 molar, whereby actinide and a minor portion of rare earth values are eluted from said partially-loaded resin and transferred into said dilute lithium chloride solution; separating the resulting actinide and rare earth value-containing aqueous solution from the stripped resin; increasing the concentration of lithium chloride in said separated solution; to a value greater than 8 molar contacting the resulting lithium chloride-loaded aqueous solution with a substantially water-immiscible organic solution comprising an organic diluent and a monoalkylphosphoric acid whereby rare earth values are transferred from the aqueous solution into said organic solution; separating the remaining aqueous solution from the resulting organic solution and recovering actinide values from said separated aqueous solution.

2. The process of claim 1 wherein the acidic aqueous solution containing actinide and rare earth values is provided with lithium nitrate in a concentration of from 6 to 9 molar.

3. The process of claim 1 wherein the aqueous solution containing a high concentration of lithium chloride brought into contact with the resin to elute rare earths therefrom contains lithium chloride in a concentration of 9 to 12 molar.

4. The process of claim 1 wherein the dilute lithium chloride solution brought into contact with the resin to elute actinide values therefrom contains lithium chloride in a concentration of from 0.1 to 5 molar.

5. The process of claim 4 wherein the dilute lithium chloride solution separated from the resin and containing actinide and rare earth values is provided with lithium chloride in a concentration of from 8 to 12 molar.

6. The process of claim 1 wherein the monoalkylphosphoric acid is mono-2-ethylhexylphosphoric acid.

7. The process of claim 1 wherein the actinide values recovered comprise curium values.

8. A process for recovering curium values from an acidic aqueous solution containing said values together with iron, chromium, nickel and rare earth values comprising the steps of providing said solution with lithium nitrate in a concentration of approximately 8 molar; contacting the resulting solution with an anion exchange resin whereby curium, rare earth values and a minor portion of said iron, chromium and nickel are sorbed on said resin; contacting the resulting loaded resin with an aqueous solution containing lithium nitrate in a concentration of 7 to 9 molar, thereby selectively eluting iron, chromium and nickel values from said resin; contacting the resulting curium and rare earth-containing resin with an aqueous solution containing lithium chloride in a concentration of 9 to 12 molar whereby a major portion of sorbed rare earth values are eluted from said resin; contacting the resulting partially-loaded resin with an aqueous solution containing lithium chloride in a concentration of 0.1 to 5 molar whereby curium and a minor portion of rare earth values are eluted from said partially-loaded resin; separating the resulting lithium chloride solution containing curium and rare earth values from the stripped resin; providing said separated solution with lithium chloride in a concentration of 8 to 12 molar; contacting the resulting lithium chloride-loaded solution with a substantially water-immiscible organic solution comprising mono-2-ethylhexylphosphoric acid whereby rare earth values transfer into said organic solution, and recovering curium values from the remaining aqueous solution.

References Cited in the file of this patent

UNITED STATES PATENTS

| | | |
|---|---|---|
| 2,683,655 | Peppard et al. | July 13, 1954 |
| 2,887,358 | Higgins et al. | May 19, 1959 |
| 3,004,823 | Peppard et al. | Oct. 17, 1961 |
| 3,034,854 | Peppard et al. | May 15, 1962 |

OTHER REFERENCES

"Reactor Fuel Processing," vol. 2, No. 4, page 13, October 1959; vol. 3, No. 3, pages 18, 19, July 1960; vol. 4, No. 2, pages 2, 25, 26, 34, 58, 59, April 1961.